(12) United States Patent
Wooldridge

(10) Patent No.: US 6,273,238 B1
(45) Date of Patent: Aug. 14, 2001

(54) APPARATUS AND METHOD FOR SEPARATING ADJACENT OBJECTS ON A CONVEYOR

(75) Inventor: Donald Wooldridge, Dunkirk, MD (US)

(73) Assignee: Batching Systems, Inc., Owings, MD (US)

( * ) Notice: Subject to any disclaimer, the term of this patent is extended or adjusted under 35 U.S.C. 154(b) by 0 days.

(21) Appl. No.: 09/482,355

(22) Filed: Jan. 14, 2000

(51) Int. Cl.⁷ ..................................................... B65G 47/28
(52) U.S. Cl. ...................................... 198/459.8; 198/459.1
(58) Field of Search .............................. 198/459.8, 459.1

(56) References Cited

U.S. PATENT DOCUMENTS

| | | |
|---|---|---|
| 1,463,527 | 7/1923 | Guenther . |
| 1,689,247 | 10/1928 | Lange . |
| 1,820,562 | 8/1931 | Guenther . |
| 3,717,236 | 2/1973 | New . |
| 3,847,273 | 11/1974 | Buhayar . |
| 4,456,117 * | 6/1984 | Szczepanksi ........................ 198/461 |
| 4,544,059 | 10/1985 | Mernøe . |
| 4,823,939 | 4/1989 | Langhans et al. . |
| 5,076,422 | 12/1991 | Clopton . |
| 5,692,594 * | 12/1997 | Sidler ............................... 198/459.8 |
| 5,779,027 | 7/1998 | Ensch et al. . |
| 5,782,332 | 7/1998 | Guidetti et al. . |
| 5,878,865 * | 3/1999 | Bailey et al. ..................... 198/459.8 |
| 6,098,785 * | 6/1998 | Van Maanen ..................... 198/459.8 |

\* cited by examiner

Primary Examiner—Donald P. Walsh
Assistant Examiner—Rashmi Sharma
(74) Attorney, Agent, or Firm—Crowell & Moring, L.L.P.

(57) ABSTRACT

A method and apparatus for separating and accelerating adjacent objects on a conveyor, which does not interpose fingers, fixtures, escapements, or the like, between the objects. The apparatus uses two adjacent sideflexing conveyors traveling, at least in part, in a curved path. Separation and acceleration of the objects is accomplished by taking advantage of the increase in velocity at the margin of the conveyor in relation to the pitch line speed where the conveyor travels in a curved path. The objects are transferred from the higher speed margin of one conveyor to the low speed margin of the other, faster, conveyor, at the curve.

20 Claims, 4 Drawing Sheets

APPARATUS AND METHOD FOR SEPARATING ADJACENT OBJECTS ON A CONVEYOR

BACKGROUND AND SUMMARY OF THE INVENTION

The present invention relates to an apparatus and method for separating adjacent objects on a conveyor. More particularly, the present invention is directed to a conveyor system which is capable of expanding a distance between two adjacent objects while moving the objects from one conveyor to another.

Separator conveyors are used to separate objects on a moving conveyor line. Usually, objects to be conveyed from one point to another in a manufacturing line are fed to a conveyor which moves the objects throughout the line. Generally, objects are fed in bulk to a conveyor line. The objects may be fed through a combining apparatus which aligns the objects in single file. Such a device is illustrated for example in U.S. Pat. No. 4,544,059. After the single file line of objects is formed, the objects tend to remain in line, against one another. Depending on the manufacturing line, a spacing may be desired between adjacent objects in order to carry out certain screening, inspection or other operations on each object. If the objects are too close together, an operation being performed on one object may interfere with an operation being performed on an adjacent object. Accordingly, it is important to control spacing of adjacent objects on the conveyor line.

In certain known separation conveyors, a mechanical device physically separates adjacent objects. For example, U.S. Pat. Nos. 1,689,247 and 1,463,527 disclose serpentine conveyor systems wherein a rotating drum having pins or fingers physically separate objects as they pass around the drum on the conveyor belt.

U.S. Pat. No. 3,386,558 discloses a feeder mechanism in which a device having fixed, radially extending arms is cam driven so that, as the device rotates, pneumatic suction cup gripping means at the ends of the arms travel along a path for removing folded carton blanks from a hopper and depositing them atop stacked containers moving along a conveyor belt. Rotationally eccentric movement is provided to the means which carries the fixed arms thereon.

U.S. Pat. No. 3,834,522 shows a transfer machine comprising a turret having a plurality of radially translatable carriages mounted thereon, which carriages are fitted with a suction cup for gripping a container. A cam track moves the carriages radially outwardly during rotation so as to enable the suction cups to grip the container at the unloading station, then retracts radially inwardly for transporting the container, and then moves radially outwardly to feed the container into the stacking device. The turret provides for intermittent movement between the stations to allow sufficient dwell time for the freshly printed containers to dry.

U.S. Pat. No. 4,369,875 discloses a slightly different arrangement wherein a series of pins is rotatingly maintained on a separate endless belt conveyor. The endless belt conveyor is driven at approximately the same rate as the feed conveyor. As objects pass the endless belt conveyor, the pins are inserted between adjacent objects thereby spreading the distance between those objects.

U.S. Pat. No. 4,726,876 discloses an apparatus for changing the spacing between articles of a moving array of discrete articles, and includes transfer means mounted for orbiting along a closed orbital path passing through a receiving zone and a discharge zone. The orbital radius of the transfer means is adjustable to provide an orbital radius in the discharge zone which is different from that in the receiving zone. The transfer means are maintained in fixed, equal angular distances between them along the orbital path whereby the orbital path distance between adjacent transfer means is different in the discharge zone from that in the receiving zone thereby resulting in a different spacing between adjacent articles in the discharge zone from that in the receiving zone. Two or more orbital spacer means may be utilized in tandem to provide the change in spacing in stages.

Other types of mechanically operated systems are also known. In each case, a device is generally engaged between adjacent objects to force the objects apart. There are several problems associated with these types of systems. Because the separator is an independently driven device, it must be controlled separately. The separate control system can be expensive and if the system breaks down, separation cannot be maintained. Yet further, the known techniques of separation require insertion of a device between adjacent objects. If the objects are fragile, they may be easily broken or damaged by insertion of the separating device. In addition, the physical touch may cause dirt or other unwanted contamination. The shape of the objects may render this approach unworkable.

The present invention is used to separate adjacent objects on a conveyor line so that certain manufacturing operations can be performed on the objects, while at the same time avoiding the problems associated with the prior known techniques of separation.

It is, therefore, an object of the present invention to provide a separating conveyor system which is free of the aforementioned and other such disadvantages wherein adjacent objects on a moving conveyor can be spaced from one another without the use of independent separating devices.

To achieve these and other advantages, the present invention is a conveyor arrangement, which accelerates and separates adjacent objects. The separation is accomplished with minimal contact and without interposing any separating means or devices. It requires little or no adjustment to work with a variety of shaped and sized objects.

The conveyor arrangement uses at least two so-called sideflexing conveyor chains arranged side-by-side similar to the conveyor chains shown in U.S. Pat. Nos. 4,823,939 and 5,779,027. This type of conveyor comprises flat topped links, which present an approximately continuous moving surface to the objects being conveyed.

The invention includes an area of the conveyor where two such chains are moving in a curve and are adjacent and parallel.

The objects to be conveyed and separated are introduced in single file on the first chain, and are riding near one margin of the chain. When the chain enters the curve, the ends of the links where the objects are riding accelerate and separate. Each conveyor section includes a plurality of links. Each link tapers from its mid-section toward each end. When the chain enters a curve the taper allows the spaces between links to close without interference on the side toward the center of curvature and to open on the opposite side. Objects are placed onto the idle end of the first conveyor, The guide rail crowds the objects toward one edge of the conveyor.

The objects are transferred from the first chain to the second chain in the curve, by a guide rail. They are now riding on the margin of the second conveyor. When the second conveyor leaves the curve and enters a straight, the link ends separate and accelerate, further separating the objects. The second chain is driven at a higher speed than the first chain. The linear velocity of the edge of the first chain at the outside of the curve is increased in consequence of the curvature and the linear velocity of the edge of the second chain at the inside of the curve is reduced in consequence of the curvature. The speeds of the chains are adjusted so the adjacent edges of the two conveyors along the curve are approximately the same. It is understood that "linear velocity" refers to the time rate of change of position of a body.

In an advantageous embodiment of the invention, the second chain enters a curve in the opposite direction, further accelerating and separating the objects. In this curve the objects are transferred to the third chain and the transfer and acceleration occurs, and when the third chain enters a straight-line section, the objects are again accelerated and separated. The process is same as transfer from first chain to second, and constitutes a second stage of the same process.

BRIEF DESCRIPTION OF THE DRAWINGS

Other objects, advantages and novel features of the present invention will become apparent from the following detailed description of the invention when considered in conjunction with the accompanying drawings, wherein:

FIG. 2b is an end elevational view of the conveyor chain link shown in FIG. 2a;

DESCRIPTION OF THE PREFERRED EMBODIMENTS

Figure 1:
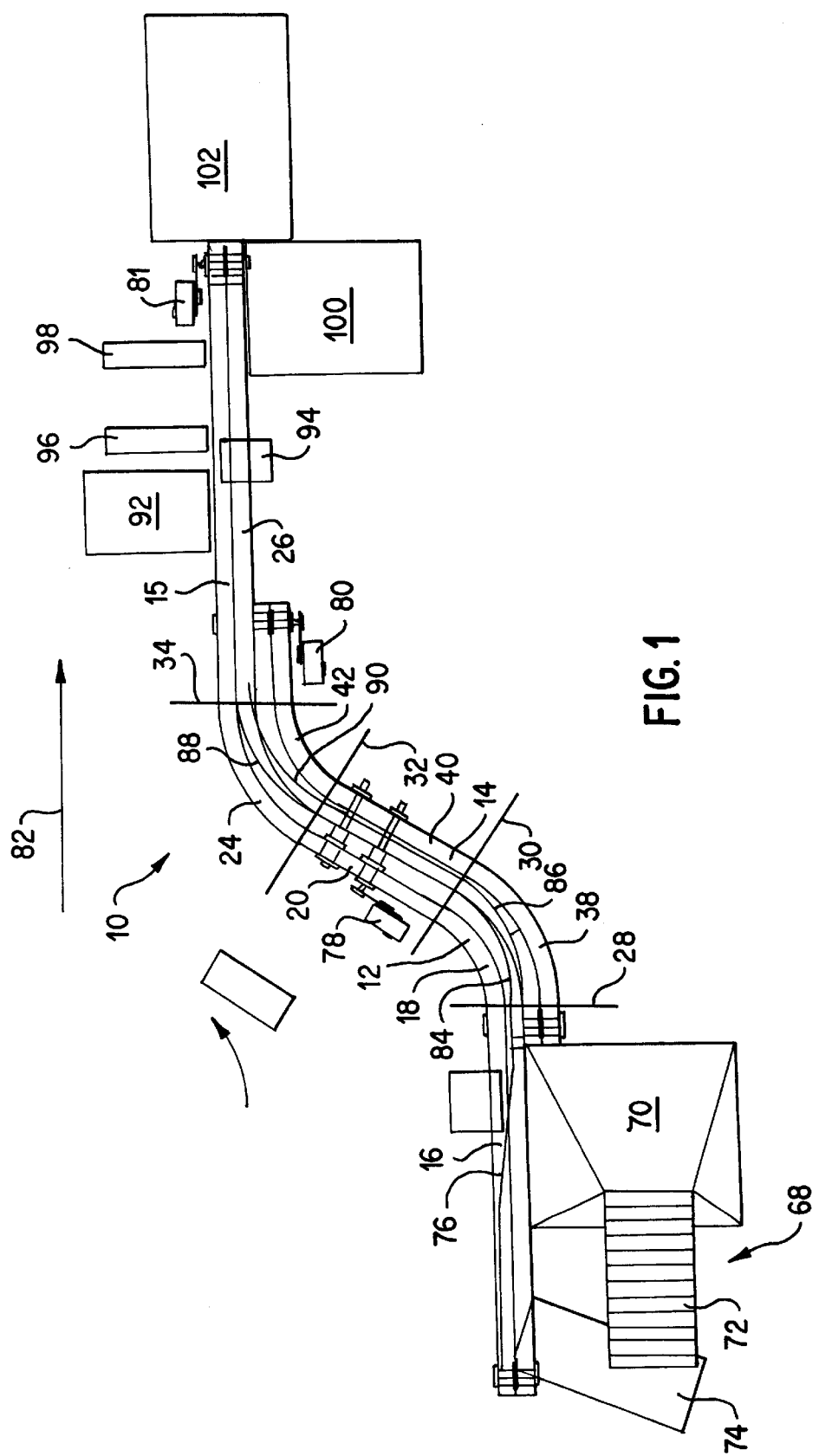
FIG. 1 is schematic top view of a preferred embodiment of the instant invention.

Attention is first directed to FIG. 1 which shows a preferred embodiment of the present invention. The separator conveyor system generally designated by the numeral 10 comprises a first conveyor 12, a second conveyor 14, and a third conveyor 15. First conveyor 12 comprises a feed section 16, a first separation section 18, and a first straightaway section 20. Third conveyor 15 comprises a second separation section 24, and a second straightaway, or discharge, section 26. Feed section 16 merges into first separation section 18 at the line designated 28. First separation section 18 then merges into first straightaway section 20 at the line designated 30. // First straightaway section 20 of first conveyor 12 merges into second separation section 24 of third conveyor 15 at the line designated 32. Second separation section 24 then merges into second straightaway section 26 at the line designated 34. First separation section 18, first straightaway section 20, and second separation section 24 comprise a separation zone.

Second conveyor 14 comprises a first separation section 38 merging into a first straightaway section 40 which merges into a second separation section 42. As can be seen from FIG. 1, second conveyor 14 runs alongside first conveyor 12 and third conveyor 15 in the separation zone.

Figure 2A:
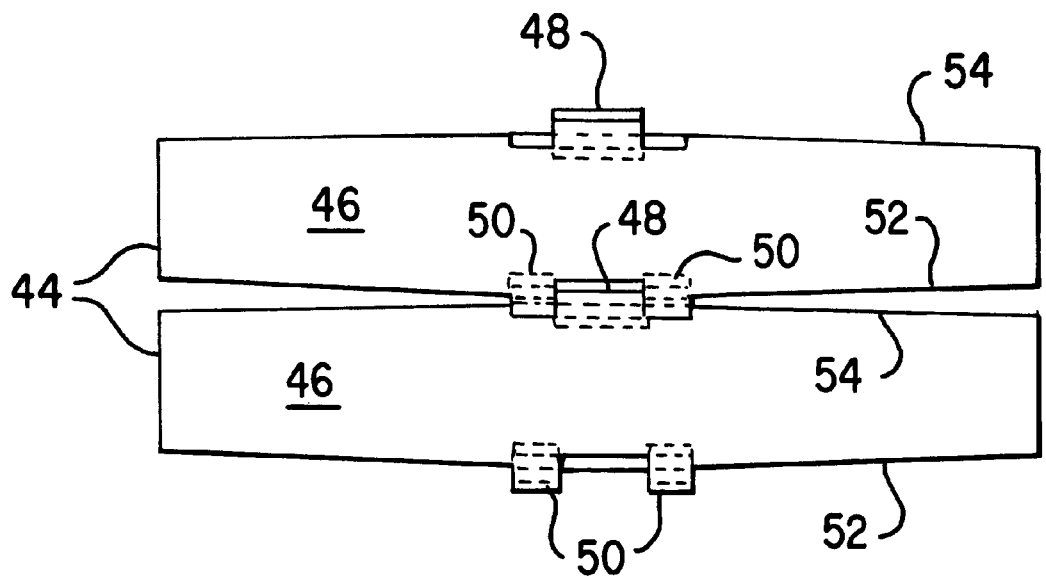
FIG. 2a is a diagrammatic plan view of two links of a preferred embodiment of a conveyor chain showing the preferred linkage.
Figure 2B:
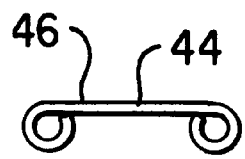

First, second, and third conveyors 12, 14, and 15 are preferably chain conveyors using links 44 of the type shown in FIGS. 2a and 2b. Each link 44 comprises a generally planar top plate 46 having a center hinge eye 48 at its trailing end and a pair of complementary hinge eyes 50 at its leading end. The leading end of each link 44 is pivotally connected to the trailing end of an adjacent leading link 44 by a first hinge pin (not shown). The trailing end of each link 44 is pivotally connected to the leading end of an adjacent trailing link 44 by a second hinge pin (not shown). The leading and trailing edges 52, 54 of each link 44 are beveled to permit relative pivotal movement or sideflexing in the horizontal direction. A sufficient number of links 44 is assembled into an endless sideflexing chain according to the desired size and configuration of the assembly in a manner which is well-known in the art. Links 44 may be fabricated of a suitable plastic or metal. Links of other shapes may be used as long as the desired flexing effect can be achieved. A suitably constructed elastomer belt could be used.

Figure 3:
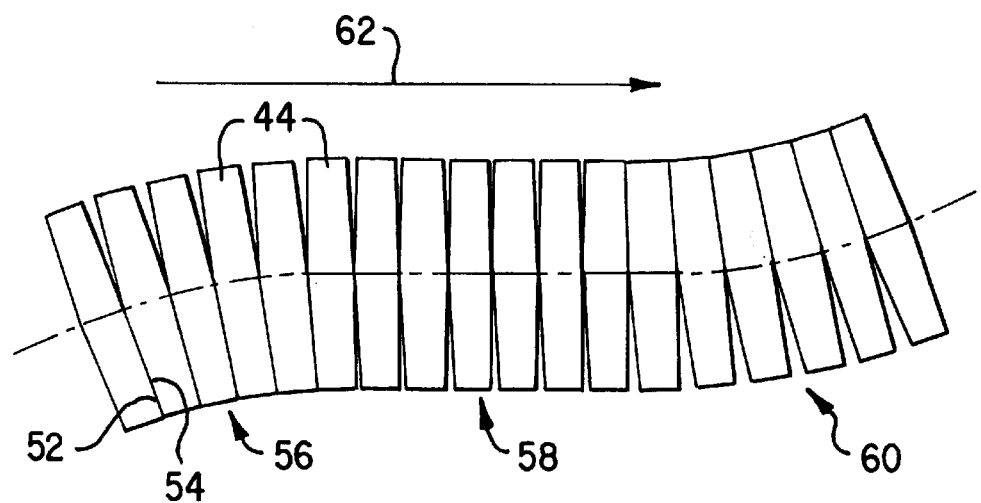
FIG. 3 is a diagrammatic plan view of a conveyor chain including a plurality of the links shown in FIGS. 2a and 2b showing the swiveling action of the links as the chain passes from a curved to a straight to a curved path of motion.

A sideflexing chain is shown in FIG. 3 where the action of links 44 as they pass from a curve 56 to the right, to a straight section 58, and into a curve 60 to the left can be seen. A plurality of links 44 are joined in a manner already described. In an area where the chain is rounding a curve to the right as shown at 56, the links 44 pivot so leading edge 52 of one link 44 essentially comes into contact with trailing edge 54 of the next adjacent link 44 at the inside of the curve. The gaps between the left ends of the links 44 are at their widest. At straightaway section 58, the links are essentially symmetrically situated around the longitudinal axis with the gaps between adjacent links 44 at each end being essentially the same. In this area, the velocity has increased. When the chain is in a curve to the left as shown at 60, the leading and trailing edges 52, 54 of adjacent links 44 come into contact at the inside of the curve, the gaps between the right ends of the links 44 are at their widest, and the velocity is further increased. The direction of movement of the chain is shown by arrow 62.

Figure 4:
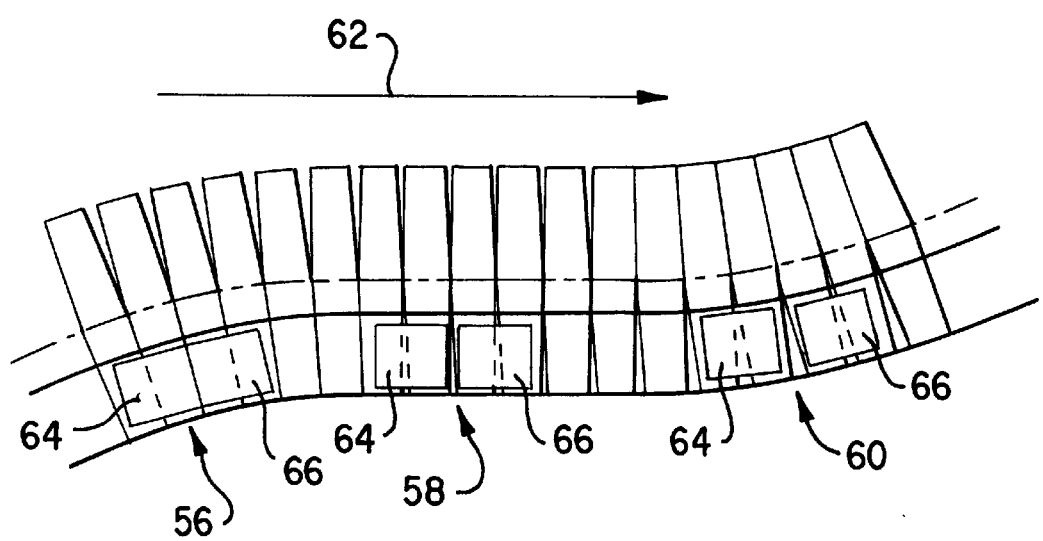
FIG. 4 is a diagrammatic plan view of a conveyor chain having adjacent objects thereon with the objects passing from curved to straight, and straight to curved, portions of the path, showing the objects becoming separated and accelerated.

Attention is now directed to FIG. 4 where, again, the direction of movement of the chain is shown by the arrow 62. Successive positions of two objects being conveyed are shown. In the first position, at curve 56, objects 64 and 66 may be separated or, as shown in FIG. 4, are essentially in contact. Once the objects have moved out of curve 56 into the straight 58, the ends of links 44 have drawn apart, thereby separating objects 64 and 66. As the objects 64 and 66 pass into curve 60, the ends of links 44 are further apart, thereby still further separating objects 64 and 66.

Figure 5:
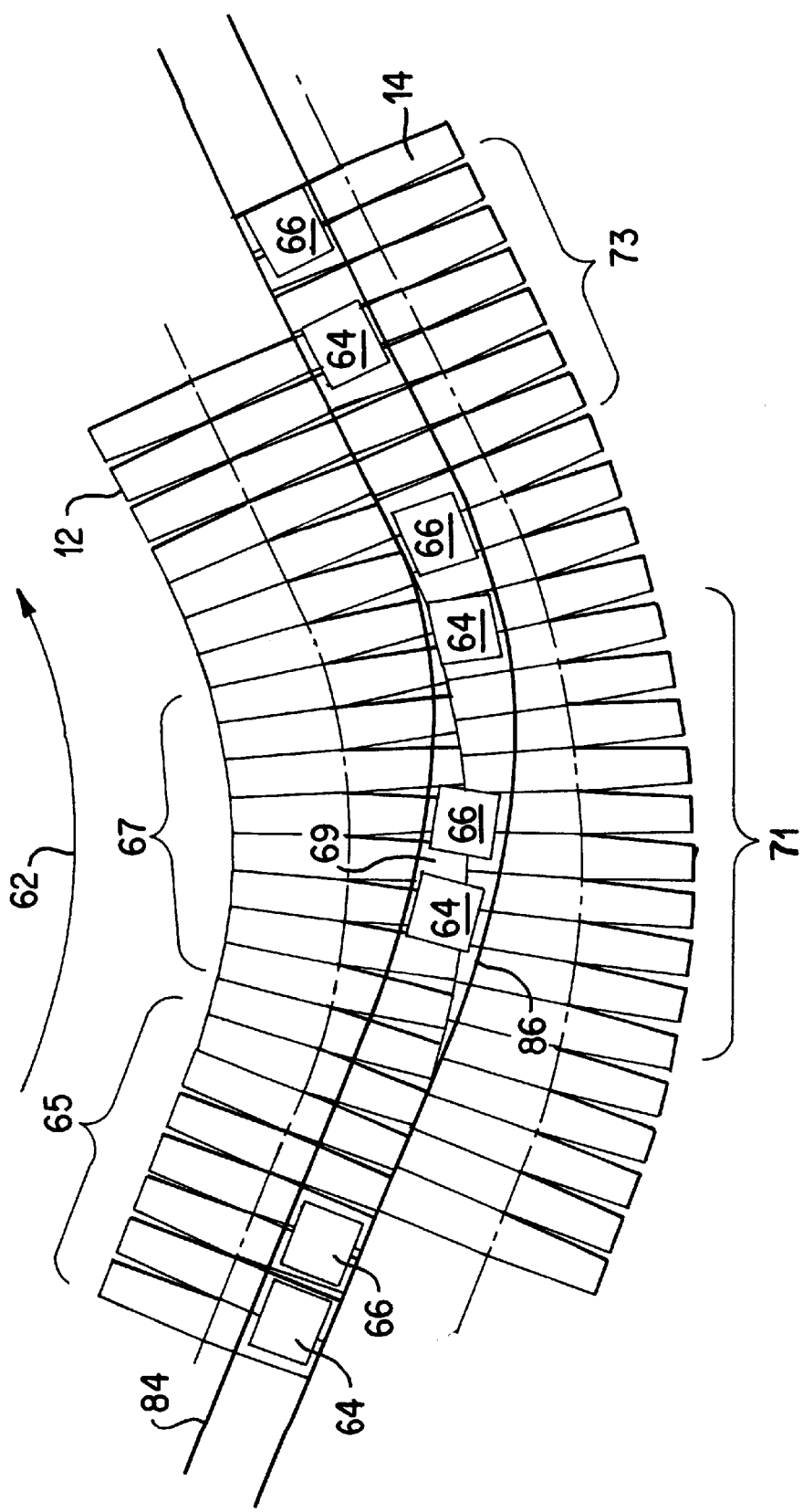
FIG. 5 is a diagrammatic plan view of adjacent conveyor chains showing objects being guided from one chain to the other in the curve, being separated and accelerated by virtue of the higher speed of the second chain.

As can be seen from FIG. 5, objects 64 and 66 are shown with some separation between them at straight section 65 of first chain 12. Chain 12 enters curve 67 and the objects acquire additional separation. Guide 84 moves the objects to chain 14 in the curve. As a consequence of the relative speeds of chains 12 and 14 they may acquire more separation as shown at 69. Guide 86 may or may not be needed as determined by the speed of the machine and the shape and size of the parts.

When chain 14 moves from curve 71 to straight 73, the objects are further separated. Depending on the nature of the objects, and the process to be applied to them, this may be an adequate separation. Otherwise, as in FIG. 1, the conveyor system has another stage of separation. The objects handled by the inventive system can be both rounded and irregular in shape, mandating the second stage.

Returning to FIG. 1, the objects to be handled are fed to feed section 16 of the first conveyor 12 by a feeder generally designated by the numeral 68. Feeder 68 comprises a hopper 70 in which the objects to be handled are stocked in bulk, an elevator conveyor 72, and a prefeeder 74. The hopper 70 is below the level of the separating conveyor. The elevator conveyor 72 raises the objects from hopper 70 and deposits them in prefeeder 74 which then feeds them by vibration in a known manner onto the feed section 16 of first conveyor 12. As will be appreciated by those skilled in the art, any known type of feeder to feed the objects to be handled to the conveyor can be used.

Objects to be handled drop randomly from prefeeder 74 on to the feed section 16 of first conveyor 12. Conveyor 12 includes an adjustable guide 76 which moves the objects to one margin of the chain. At the same time, the objects are marshaled into single file. Guide 76 is adjustable to account for objects of varying shapes and sizes and may include fixtures (not shown) to discriminate the objects based on their orientation, and may turn the objects or reject some of them to fall back to hopper 70. Although guide 76 is illustrated as a pivotable bar, other embodiments are also contemplated, such as a pneumatic system, a robotic arm, or a fixed guide rail.

First conveyor 12 is driven by a motor and transmission 78 as is well-known in the art. Second conveyor 14 is also driven by a known motor and transmission arrangement 80, preferably at a higher speed than first conveyor 12. Third conveyor 15 is also driven by a known motor and transmission arrangement 81, preferably at a higher speed than second conveyor 14. The difference in speed between the first and second conveyors, and between the second and third conveyors, can easily be determined by those skilled in the art. Conveyors 12, 14, and 15 are all driven in the direction shown by the arrow 82.

Conveyors 12 and 14 are positioned such that adjacent edges of the chains align and the tops of the chains are essentially coplanar, thereby allowing for easy movement of articles from one chain to another. Suitably adjusted guides 84 and 86 move the objects from first conveyor 12 to second conveyor 14. Guides 84 and 86 can be of similar construction as guide 76. Similarly, conveyors 14 and 15 are positioned such that adjacent edges of the chains align and the tops of the chains are essentially coplanar, thereby allowing for easy movement of articles from one chain to another. Suitably adjusted guides 88 and 90 move the objects from second conveyor 14 to third conveyor 15. Guides 88 and 90 can be of similar construction as guides 76 and/or guide 76.

The mode of operation of the conveyor system 10 will now be described with reference to FIG. 1. Objects to be handled, stored in hopper 70, are conveyed to prefeeder 74 by elevator conveyor 72. Prefeeder 74 then feeds the objects to feed section 16 of first conveyor 12. It is to be distinctly understood that any suitable feed apparatus could be used to feed the objects to the conveyor 12. The hopper-elevator conveyor-prefeeder arrangement is the presently preferred such device.

The objects are then guided by guide 76 into single file and onto second conveyor 14 by guides 84 and 86. The objects are separated and accelerated where chain 12 enters the curve at first separation section 38 and the ends of links 44 separate. The objects are further separated and accelerated during the transfer to chain 14 and again where chain 14 leaves the curve and enters the first straightaway section 40.

Guides 88 and 90 guide the objects from second chain 14 to third chain 15 at the second separation section 24. The objects are separated where chain 14 enters the curve, again where they transfer to chain 15, and again where chain 15 exits the curve and enters the final straightaway 26.

In the embodiment shown, the objects then pass through a machine 92 which affixes an adhesive label, a device 94 to press the label firmly in place, a reading station 96 which confirms the label is readable, and a blow off station 98 which takes the objects which do not have readable labels and deposits them into bin 100. The objects then go on to the next processing stage schematically shown at 102. Element 102 may be a bin, or another conveyor, or any suitable continuation of the flow. Suitable sensors, whether photoelectric or mechanical, controllers, etc., all well-known in the art, may be used to control the operation of all or part of the system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A conveyor arrangement for separating objects, comprising:

at least two sideways flexing conveyors arranged parallel and side-by-side, and which run for at least part of their length in a curved path;

wherein, at a point in the curved path, the linear velocity at the side of the first conveyor which adjoins a side of the second conveyor is increased in consequence of the curvature and the linear velocity at said side of the second of said two conveyors is reduced in consequence of the curvature; and at least one guide that guides objects to enable the objects to transfer from the first of said two conveyors to the second of said two conveyors at said point;

wherein said second conveyor is run at a higher speed than said first conveyor;

whereby, the speed of the second conveyor is equal to or greater than the speed of the first conveyor at the transfer point.

2. A conveyor arrangement as defined in claim 1, wherein at least one of said conveyors comprises an endless chain traveling at a pitch line velocity, said chain comprising links joined to each other such that said chain is able to flex when traveling along a curved path, each of said links having a shape such that the ends of the links toward the center of curvature of said curved path move closer together and travel at a slower velocity than the pitch line velocity of the chain, and the ends of the links away from the center of curvature of said curved path are spread apart and travel at a faster velocity than the pitch line velocity of the chain.

3. A conveyor arrangement as defined in claim 2, wherein said links are flexibly joined at a central portion thereof and taper in width from the center thereof to the ends, whereby when the links move in a curved path, facing sides of adjacent links closer to the center of curvature move together and facing sides of adjacent links away from the center of curvature move apart.

4. A conveyor arrangement as defined in claim 2, wherein top surfaces of said links are planar.

5. A conveyor arrangement as defined in claim 1, wherein said conveyors are driven by separate drive motors.

6. A conveyor arrangement as defined in claim 1, wherein said conveyors are driven by a single motor, with the second conveyor being driven faster than the first conveyor.

7. A conveyor arrangement as defined in claim 1, further comprising a third conveyor;

wherein the first and second conveyors are parallel and include a first curved section in at least part of their path, and the second and third conveyors are parallel and include a second curved section in at least part of their path, said second curved section being a reverse curve relative to said first curved section;

wherein, at a point in the second curved section, the linear velocity at the side of the second conveyor which adjoins a side of the third conveyor is increased in consequence of the curvature and the linear velocity at said side of the third conveyor is reduced in consequence of the curvature; and at least one guide that guides objects to enable the objects to transfer from the second conveyor to the third conveyor at said point in the second curved section.

8. A conveyor arrangement as defined in claim 7, comprising a first straight portion, a first curved portion, and second straight portion, a second straight portion, a second curved portion, and a third straight portion; wherein said first straight portion is an infeed zone of said first conveyor, said first curved portion comprises said first and second conveyors, said second curved portion comprises said second and third conveyors, and said third straight portion is a discharge zone of said third conveyor.

9. A conveyor arrangement according to claim 1, further comprising a supply hopper and a feed conveyor to feed a plurality of objects from said hopper onto said first conveyor.

10. A conveyor arrangement as defined in claim 1, wherein top surfaces of adjacent conveyors are coplanar.

11. A conveyor arrangement as defined in claim 10, wherein the plane of the top surfaces is inclined to one side.

12. A separator conveyor for simultaneously conveying and separating objects, comprising:

a separating and accelerating conveyor comprising at least a pair of adjacent conveyor belts, each conveyor belt comprising a plurality of links having a shape such that respective ends of adjacent links on each conveyor have a variable gap there between, and each conveyor belt having an edge adjacent an edge of the other conveyor belt;

at least one guide device for guiding objects from one conveyor to the other;

a motor control system for independently driving the separating conveyor belts at different speeds;

wherein the plurality of links comprises an arrangement of links wherein each link is pivotable about a center region thereof to vary the adjustable gap between adjacent link edges thereby separating and accelerating objects guided from one conveyor to the other.

13. A separator conveyor according to claim 12 wherein the pair of conveyor belts has a curved radius along a horizontal plane.

14. A separator conveyor according to claim 13, wherein the links are pivoted about the mid-section by movement around the curved conveyor radius.

15. A separator conveyor according to claim 14, wherein two sets of conveyor belts are provided and are arranged to transfer objects along a length thereof.

16. A separator conveyor according to claim 12, further comprising a feed conveyor that aligns a plurality of objects into a single file and feeds the objects to the separator and accelerating conveyor.

17. A separator conveyor according to claim 16, wherein said feed conveyor further comprises a guide arrangement to guide the plurality of objects into the single file orientation.

18. A method for separating objects on a conveyor system comprising at least two sideways flexing conveyors arranged parallel and side-by-side, traveling at least partly in a curved path, and having coplanar conveying surfaces, said method comprising:

guiding the plurality of objects into a single file orientation on the first of said at least two conveyors; and causing the objects to transfer from said first conveyor to the second of said at least two conveyors during travel along said curved path.

19. A method as defined in claim 18, further comprising driving said second conveyor at a higher speed than said first conveyor.

20. A method as defined in claim 19, wherein the linear velocity of each of said conveyors at its edge along the outside of the curve is approximately equal to the linear velocity of the adjacent conveyor at its edge along the inside of the curve.

* * * * *